(12) United States Patent
Freifeld

(10) Patent No.: US 6,271,963 B1
(45) Date of Patent: Aug. 7, 2001

(54) MICROSCOPE ILLUMINATOR FOR CYLINDRICAL OBJECTS

(76) Inventor: Daniel Freifeld, 32 Clapboard Hill Rd., Westport, CT (US) 06880

( * ) Notice: Subject to any disclaimer, the term of this patent is extended or adjusted under 35 U.S.C. 154(b) by 0 days.

(21) Appl. No.: 09/229,973

(22) Filed: Jan. 14, 1999

Related U.S. Application Data

(60) Provisional application No. 60/071,709, filed on Jan. 16, 1998.

(51) Int. Cl.[7] .................................................. G02B 21/06

(52) U.S. Cl. .......................... 359/385; 359/389; 362/298; 348/131

(58) Field of Search ..................................... 359/385, 387, 359/389, 390; 362/297, 298, 300; 348/125, 126, 131

(56) References Cited

U.S. PATENT DOCUMENTS

| | | | |
|---|---|---|---|
| 3,843,227 | * 10/1974 | Kato et al. | 359/387 |
| 4,449,818 | * 5/1984 | Yamaguchi et al. | 356/237 |
| 4,737,022 | * 4/1988 | Faltermeier et al. | 359/387 |
| 5,684,530 | * 11/1997 | White | 348/131 |
| 5,820,250 | * 10/1998 | Betts et al. | 362/216 |

* cited by examiner

Primary Examiner—Cassandra Spyrou
Assistant Examiner—Mark A. Robinson
(74) Attorney, Agent, or Firm—Handal & Morofsky

(57) ABSTRACT

An illumination device for attachment to an optical imaging apparatus, such as a microscope, that provides bright, even illumination throughout the part under observation. The illuminating device has a diffuse light source, an optical element to receive part of the light from the light source and reflecting part toward the object under observation, and reflecting elements to collect and redirect stray light rays toward said object. The reflecting elements can be angled parallel to the beamsplitter and transverse with the part.

23 Claims, 4 Drawing Sheets

MICROSCOPE ILLUMINATOR FOR CYLINDRICAL OBJECTS

This application claims benefit of provisional application Ser. No. 60/071,709 filed Jan. 16, 1998.

TECHNICAL FIELD

The present invention relates to light sources for use in conjunction with optical microscopes and is particularly suited for the illumination of an object, at least a part of whose surface may be defined by the movement, along a curved path, of a line parallel to itself.

BACKGROUND

Even the human eye with its remarkable ability to capture huge amounts of optical information glare, uneven illumination, and insufficient light pose substantial problems to visual assessments. Moreover, these problems are complicated by the fact that their true nature and extent are defined by the strength, position, angular orientation, and emission topology of the light source as well as the size, configuration, position, optical finish and orientation of the object being illuminated. Failure to achieve proper illumination can result in a wide range of problems ranging from increased accident rates for drivers in automobiles to unacceptably high approval rates for defective parts in manufacturing.

Today, in an attempt to avoid the high cost of human optical inspection, and also to avoid the sometimes unpredictable problems caused by fatigue, distraction and other human factors, industry has turned increasingly toward computerized inspection systems. With such systems, however, the resolution of the optical inspection apparatus is far below that of the human eye. Accordingly, factors such as glare, insufficient illumination, uneven illumination, effects caused by the optical finish of the surface, and degraded optical resolution, present serious problems.

Moreover, such inspection is typically done by a video device viewing an object through a microscope. In a microscope, the objective housing is positioned over the object to be viewed. Light must be caused to fall on the object in a multitude of directions in order to illuminate all features of the object. However, the space available for placing a light source in a microscope is very limited. The problem is further complicated because much of that space is taken up by the object and the optical train (centered on the optical axis of the microscope) of the microscope which must be kept near the object in order to keep the object visible through the eye piece of the microscope.

The classical approach to this problem is to place a so-called ring illuminator just below the microscope objective. The ring illuminator is comprised of a circular ring like mechanical member which supports a plurality of light sources disposed around the circular periphery of the illuminator. The light sources have a pattern which shed the overwhelming majority of their output light within an angular subtense having a range of between, 1) directly and perpendicularly downward in the direction of the plane of the object being viewed and 2) downward through a ray path oriented between a point on the circular periphery of the illuminator and a point on the optical axis of the focal plane at a specified distance below the plane defined by the ring illuminator.

The advantage of the ring illuminator is that its center is open, thus allowing the microscope objective to collect light rays directly below the objective, and at the same time, light is provided from a plurality of points along the periphery and aimed, to a large extent, at the space below the ring illuminator.

While a ring illuminator is an effective way of shedding light on object without blocking the optical train or optical path of a microscope, it tends to suffer from all of the illumination problems discussed above. Indeed, because ring illuminators generally comprise a plurality of point sources, the above problems can be particularly egregious.

In particular, ring illuminators generally have the defect, as in the case of the illumination of the top of a cylindrical object, of presenting the image of two bright stripes, thereby tending to conceal the surface area of interest. This is particularly true of specular (highly reflective) surfaces.

The demands put on illumination systems by so-called "machine vision systems" have spawned a wide variety of devices. Generally, such systems followed the lead of the ring illuminator, comprising sources which are substantially symmetrical along orthogonal axes. See, for example, the system disclosed in U.S. Pat. No. 5,461,417.

The approach in many machine vision illumination systems is to use a light diffusing plate in conjunction with a beamsplitter to achieve the diffuse illumination required in certain applications. In particular, light is output by a diffuse light source, such as a translucent or an opal glass plate which is illuminated from behind, and this light is caused to fall on the beamsplitter or half-silvered mirror which is oriented to reflect the light onto the workpiece under observation. At the same time, because the beamsplitter is semi-transparent, and positioned in the optical train of the microscope, the beamsplitter allows light to pass from the workpiece into the microscope objective which then collects and focuses the light onto the detector of the machine vision system. While such systems do address some of the aforementioned problems, it has been discovered in accordance with present invention, that machine vision illumination systems suffer from the relatively inefficient use of light. In addition, there is a tendency to obscure many surface details. Indeed, the tendency to destroy surface details is useful if one wishes to inspect other features, such as reflectivity or the like.

Such problems are, however, particularly serious in the case of objects having a cylindrical configuration. By "cylindrical configuration", in this specification, the applicant wishes to embrace the general definition of a cylindrical surface, that is to say a surface which is defined by the movement of a line along a curve, with the line maintaining an orientation parallel to its original position, as well as surfaces which, while not strictly cylindrical in shape, share optical characteristics and illumination problems in connection with cylindrical surfaces. Thus these surfaces include the surface of a right cylindrical cylinder, as well as a number of other surfaces which could be formed by the curling of a planar sheet of material, such as paper.

When the cylindrical object is, for example, made of metal and thus has a relatively shiny optical finish, the above problems are substantially complicated. More particularly, if the object is a right cylindrically shaped object, and is formed of a metal mesh or expanded metal material, the large number of elements having orientation substantially parallel to the axis of the cylinder will present a plurality of reflections, under illumination from conventional light sources, whose intensity will tend to over power the ability of the optical sensor to detect the edge of the object adjacent to the glarish reflection.

SUMMARY OF THE INVENTION

In accordance with present invention, it has been discovered that so-called on axis systems incorporating a beamsplitter or half-silvered mirror and a diffuse light source can be improved by providing them with a reflector, or, more particularly, a pair of a reflectors which are oriented to collect and redirect light output, by a diffuse light source, toward the workpiece under observation. In accordance with the preferred embodiment, these mirrors are positioned below the beamsplitter. Moreover, in accordance with the preferred operating mode of the inventive system, the reflectors are positioned at angles substantially parallel to the beamsplitter and substantially transverse thereto, with the workpiece positioned between reflectors.

In accordance with the inventive method, illumination of a cylindrical object in a machine vision system is achieved by the use of a diffuse light source, which is several times the length of the object to be illuminated, and in the range of three to twelve times longer than it is wide, preferably having a length six times its width. In accordance with the inventive method, the cylindrical object to be examined is positioned with its axis perpendicular to the length of the light source. The mirrors have a length and width, with the length of the mirrors positioned transversely to the length of the beamsplitter.

In accordance with the preferred embodiment, the beamsplitter is formed by a metalized film member, preferably made of nitrocellulose film having a thickness in the range of five microns. The film is supported on a support frame, and preferably secured to the edges of the support frame.

Insofar as the center of the beamsplitter performs the function of transmitting the image of the workpiece as well as reflecting illumination, the remaining portions of the beamsplitter merely function to illuminate the workpiece. It is important, and in accordance with the preferred embodiment of the invention, to take extraordinary measures to maintain the flatness of the central portion of the beamsplitter. The same is achieved by lapping the center of the frame which supports the beamsplitter to tolerance of a half wavelength of the shortest light output by the inventive illuminator.

The inventive system is particularly applicable as an illumination device for use in conjunction with optical microscopes in both human and machine vision applications, where magnifications are in the range of 10 to 50 power. Particularly important applications of the inventive system are within the context of measurement and the cosmetic evaluation of polished objects, where prior art illuminators may obscure or distort surface features. In certain applications, it may be desirable to incorporate relay or re-imaging lenses into the inventive illuminator assembly.

BRIEF DESCRIPTION OF THE DRAWINGS

These and other objects of the invention will become apparent from the annexed drawings, which illustrate only one embodiment of the invention, and in which.

DETAILED DESCRIPTION OF THE BEST MODE

Figure 1:
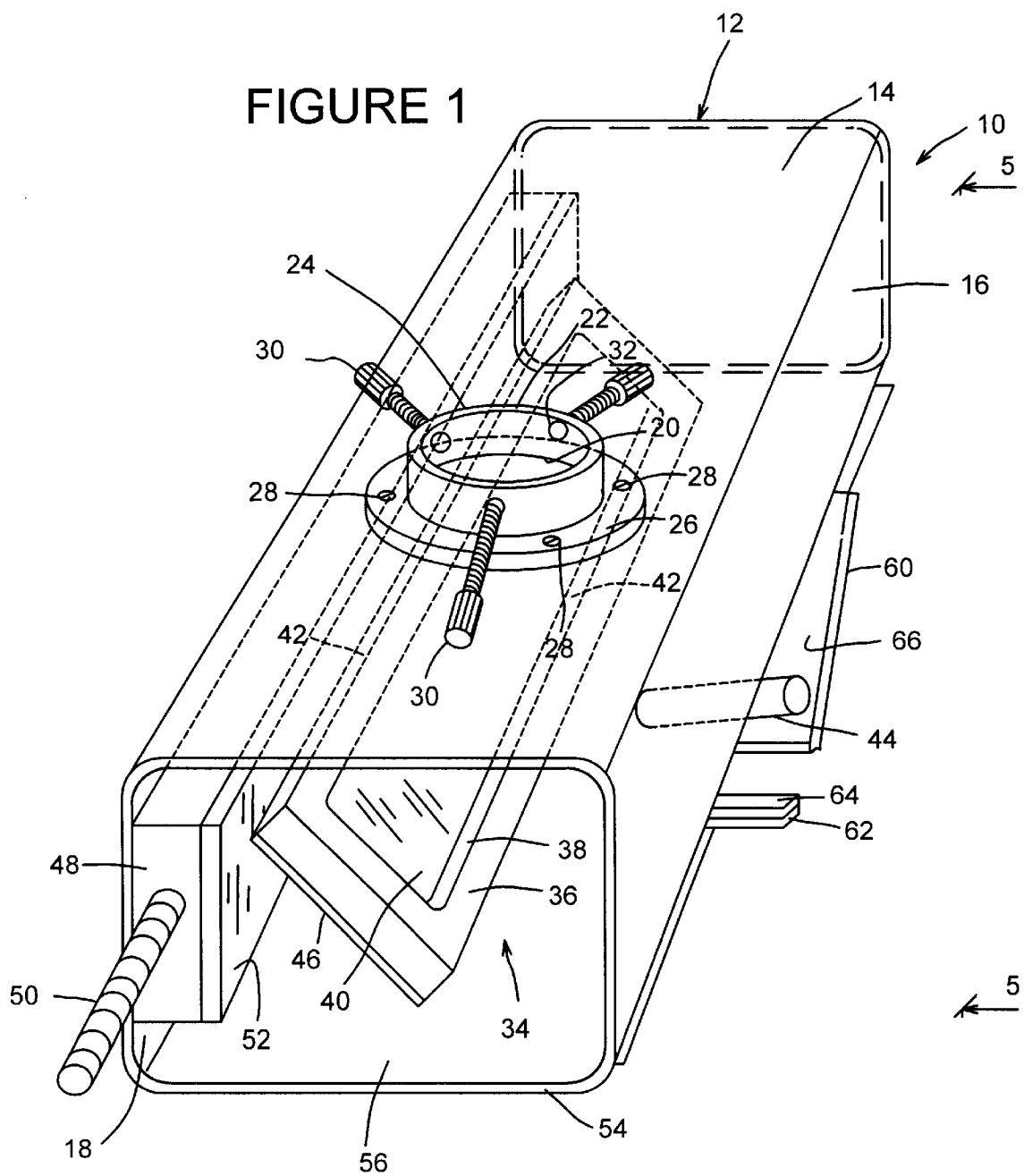
FIG. 1 a perspective view of the present invention.

Referring to FIG. 1, an illuminator 10 for a microscope is illustrated. Illuminator 10 comprises an upper housing 12, which has been formed from a single sheet of metal which has been bent into an inverted u-shaped configuration. Upper housing 12 comprises a top panel 14, and the pair of side panels 16 and 18. Top panel 14 defines a hole 20. A turret 22, comprising a tubular member 24 integral with an annular flange 26 is secured to top panel 14 by three screws 28.

Tubular member 24 has an inner diameter selected to tightly match the objective housing of a microscope to which it is to be secured. Tubular member 24, together with illuminator 10, is secured to the microscope objective by a plurality of thumbscrews 30. In accordance with the preferred embodiment, three thumbscrews are employed, and positioned at three points uniformly spaced around the periphery of flange 26. In principle, however, a single thumb screw will function to secure in the inventive illuminator 10 in place. Thumbscrews 30 are supported in tapped holes 32 in tubular member 24.

Positioned within housing 12 is a half-silvered mirror or beamsplitter 34. Beamsplitter 34 comprises a frame 36, which has an inner surface 38 substantially perpendicular to the plane of the frame. The beamsplitter 34 is completed by a half-silvered membrane 40, which is made of nitrocellulose and has the thickness of five microns in accordance with the preferred embodiment of the invention. The fact that membrane 40 is exceedingly thin results in particularly advantageous optics because the effect of multiple reflections within the membrane is minimized.

Performance can be optimized by the use of conventional anti-reflection coatings in accordance with coating techniques well-known in the industry. The techniques used for coating the membrane, to achieve the function of a beamsplitter, are also well-known in the industry and form no part of the invention. In accordance with the present invention, the half-silvering of the membrane is carried on until it transmits as much light as it reflects.

The central area 42 of frame 34 is lapped to a tolerance of half the wavelength for the shortest light output by the inventive illuminator. This needed because the central portion of membrane 40, besides performing the function of reflecting light to illuminate the object, also must transmit an image of the workpiece 44 under observation without distortions. In particular, the surface 46 of the frame in the region on central area 42 is lapped to a flatness within the above tolerance. Membrane 40 is secured to frame 34 by being glued to surface 46.

Light is provided to the system by a light source 48 which is supplied with light by a fiber-optic bundle 50 and outputs that light as a uniform diffuse white illuminating body in the form of an opal panel 52. The construction of light source 48 is of known construction, and is illustrated, for example, in U.S. Pat. No. 5,187,765.

The body of the inventive illuminator 10 is completed by a bracket 54. Bracket 54 (not illustrated FIG. 2) comprises a pair of housing closure panels 56 and 58 as can be seen most clearly in FIG. 3. Bracket 54 also comprises a pair of mirror support panels 60 and 62 which support mirrors 64 and 66. Finally, a support panel 68 is integral with the mirror support panels 60 and 62. Support panel 68 includes a pair of holes 70 and 72 (FIG. 4) configured to receive a pair of screws 74 and 76 (FIG. 5). Screws 74 and 76 secure bracket 54 to side panel 16 of upper housing 12.

Figure 4:
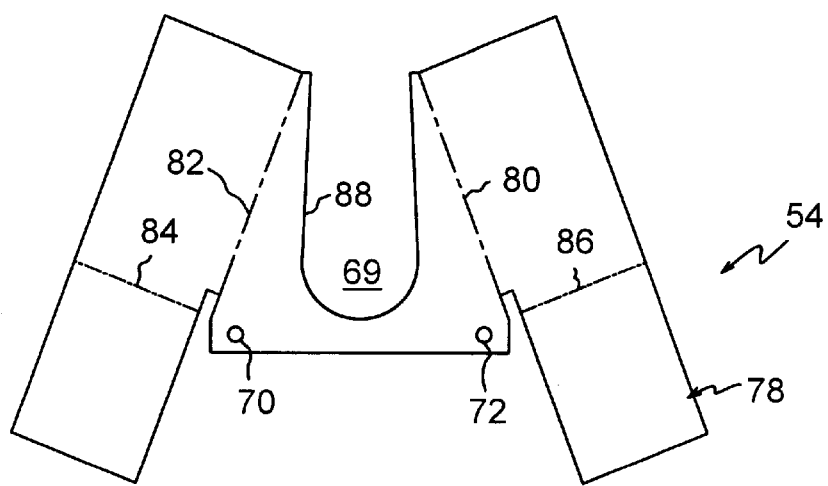
FIG. 4 is a plan view of the body of the inventive illuminator of the present invention prior to assembly.
Figure 5:
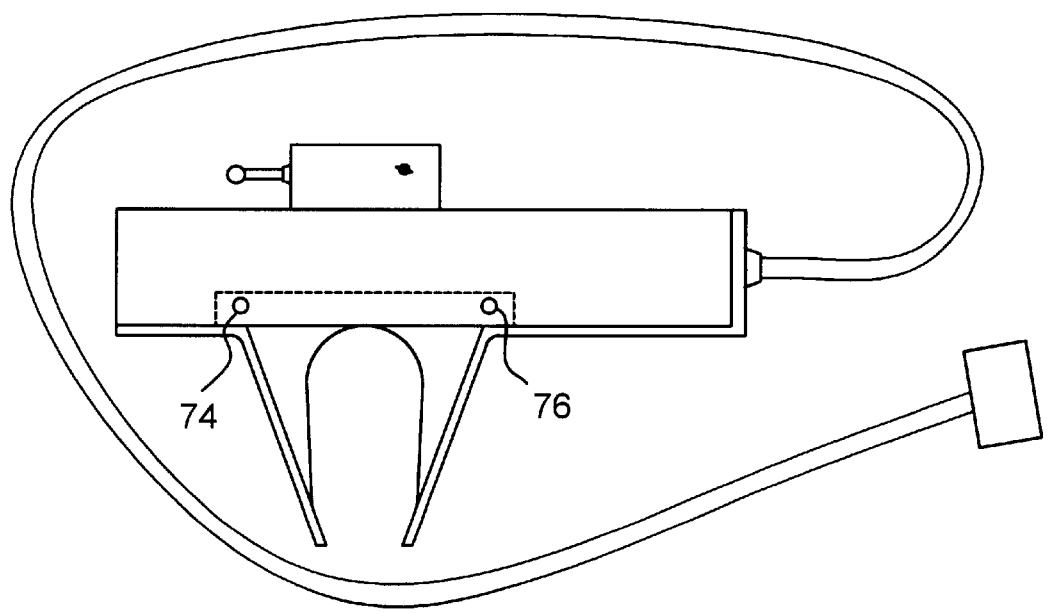
FIG. 5 is a side view of the present invention taken along lines 5—5 of FIG. 1.

As is illustrated in FIG. 4, bracket 54 is made from a single piece of metal sheet 78 cut in the shape illustrated in FIG. 4. Sheet 78 is bent upwardly at bend lines 80 and 82, with respect to the plane of the paper in which FIG. 4 is printed and is bent downwardly along bend lines 84 and 86. A passage area 88 is defined by the u-shaped cutout 69 in support panel 68. This u-shaped cut out allows insertion of the workpiece into the object space of the microscope, as illustrated in FIG. 1.

Figure 2:
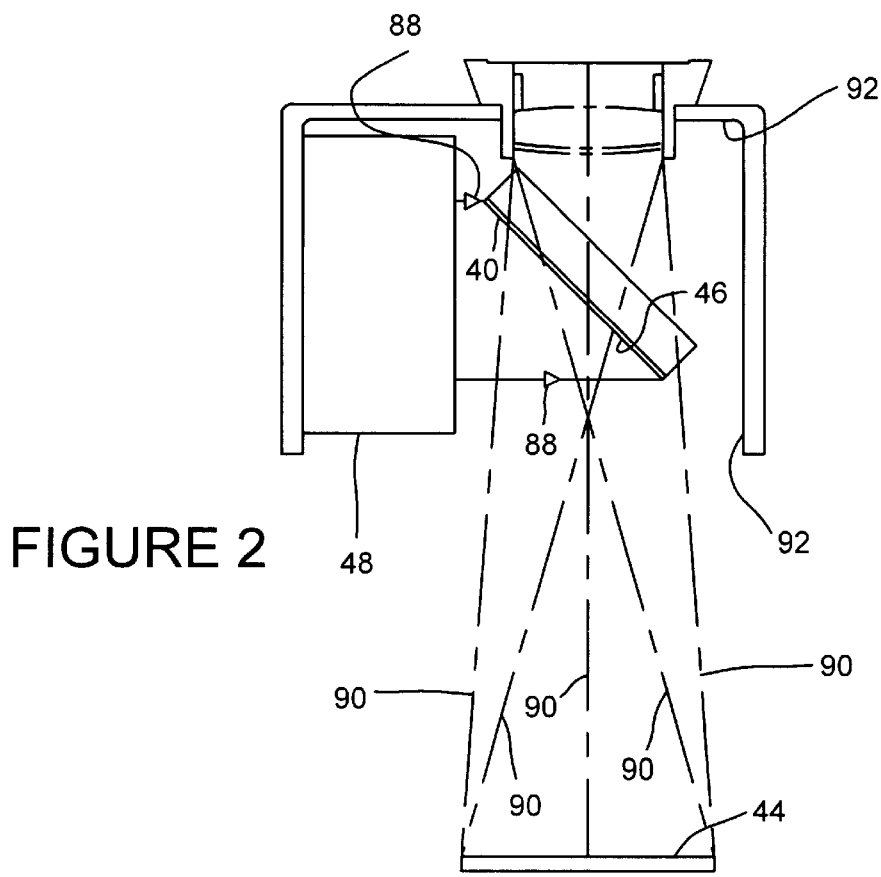
FIG. 2 is a schematic view depicting the paths taken by light rays in accordance with the present invention.
Figure 3:
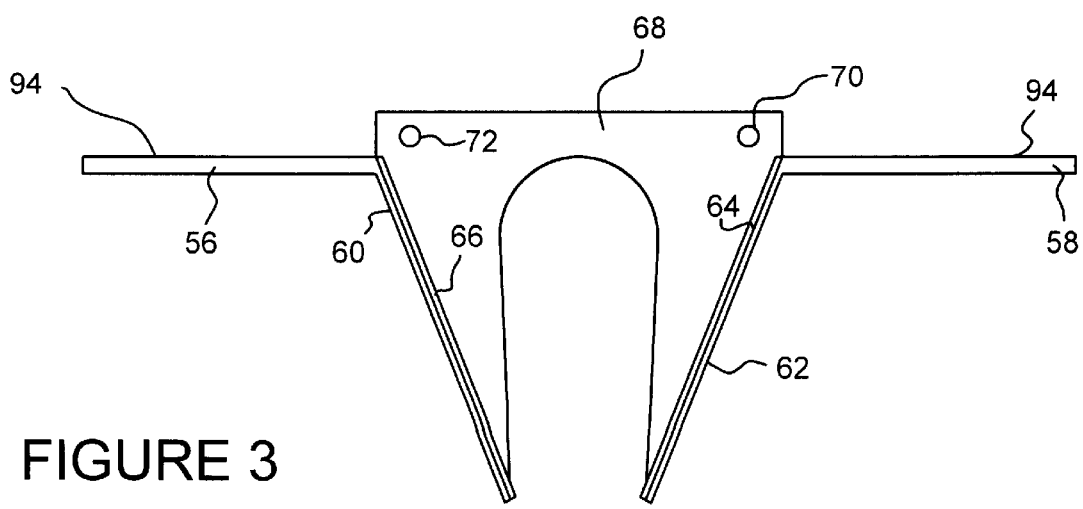
FIG. 3 is a side view of the body of the inventive illuminator of the present invention after assembly.

The operation of the inventive illuminator 10 may be understood with reference to the ray trace diagram of FIG. 2. In particular, light rays 88 exit source 48 and fall on half-silvered mirror or beamsplitter 34. Half of the light is reflected downwardly toward workpiece 44, illuminating the workpiece. This light is reflected by the workpiece and any stray light is collected between mirrors 64 and 66, illustrated in FIGS. 1 and 3. This stray light is then reflected back towards the workpiece improving illumination. Light rays 90 reflected into the pupil of the microscope objective are then collected by the microscope. The interference of stray light is minimized by painting the inside surface 92 of upper housing 12, and the inner surfaces 94 of housing closure panels 56 and 58 with a flat black paint typically used for the purpose in the optics field.

Figure 6:
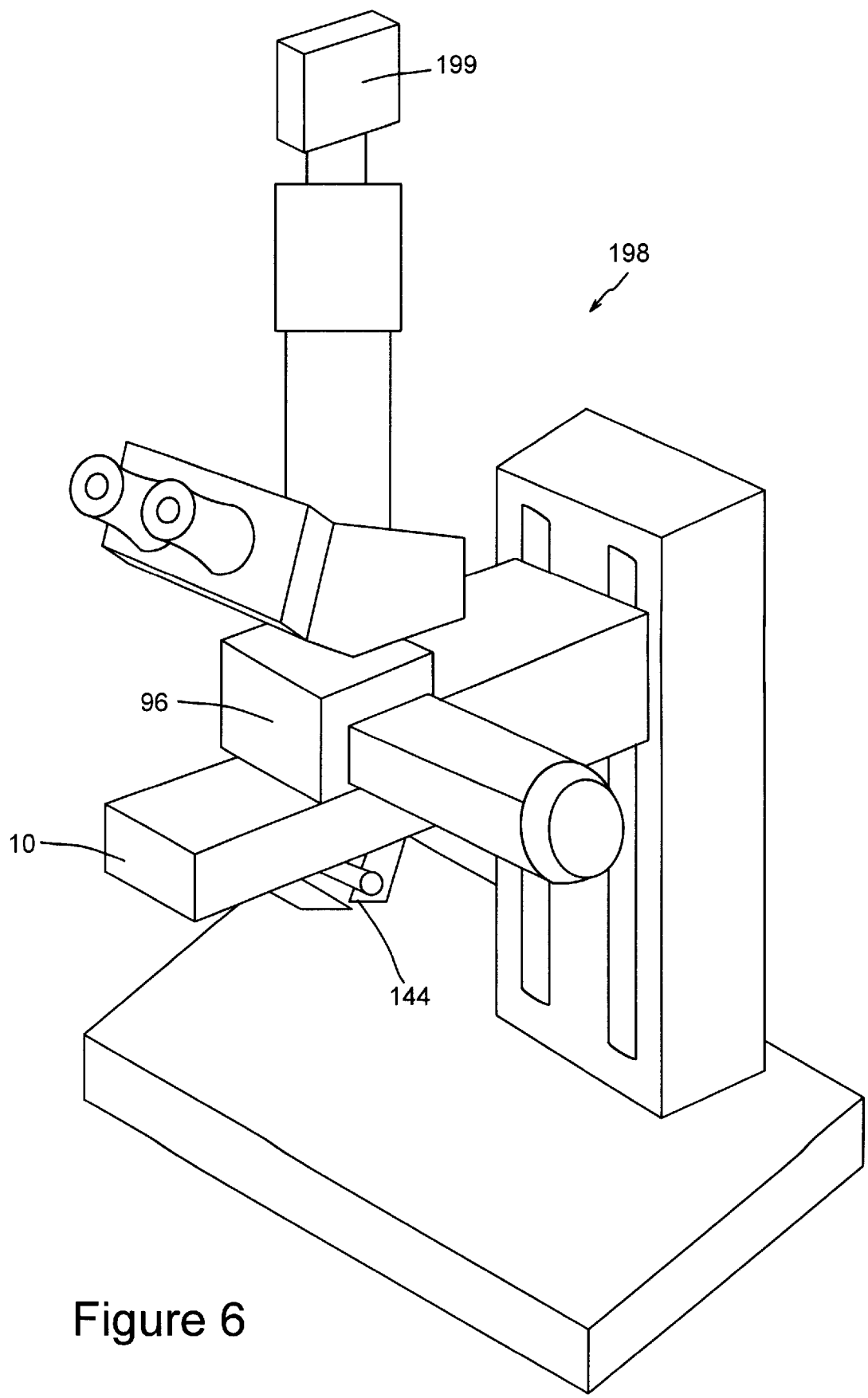
FIG. 6 is an alternative embodiment of the present invention.

While the inventive illuminator 10 may be used in conjunction with a video camera, a microscope or any other optical device requiring a source of illumination, FIG. 6 illustrates an inventive illuminator 110 secured to the housing 196 of a microscope 198 of the type utilizing a video camera 199, view object 144.

While an illustrative embodiment of the invention has been described, it is, of course, understood that various modifications of the invention may be made by those of ordinary skill in the art without departing from the spirit and scope of the invention which is limited and defined only by the appended claims.

What is claimed is:

1. An illumination device for use with an optical imaging apparatus, said optical imaging apparatus having focusing optics, said focusing optics having an optical axis, light emitted from an object under observation traveling generally in the direction of said optical axis from said object under observation through said focusing optics to be focused into an image, said object being placed within the field of view of said optical imaging apparatus, said illumination device comprising:
   (a) a diffuse light source;
   (b) an optical element having a width and a length, said optical element being positioned to receive light from said light source and having the characteristic of reflecting a portion of the light emitted from said light source toward said object under observation, whereby said object is illuminated and reflects light toward said focusing optics and having the further characteristic of transmitting a portion of the light reflected from said object toward said focusing optics, the length of said optical element being oriented along a second axis and said optical element being positioned at an acute angle with respect to said optical axis; and
   (c) a pair of reflecting elements, said reflecting elements being angled to collect and redirect light toward said object under observation, said reflecting elements each having a longer side, each said longer side extending transverse to said optical axis and said second axis.

2. A device as in claim 1, wherein said device is configured to observe an object having a roughly cylindrical form, said object being placed within the field of view of said optical imaging apparatus with the axis defined by said roughly cylindrical form oriented along a first axis which is transverse to said optical axis.

3. A device as in claim 2, wherein said optical element has a length several times greater than its width.

4. A device as in claim 3, wherein said optical element further comprises:
   (i) a frame, the central portion of said frame having a flatness within a specified tolerance;
   (ii) a thin film secured to said frame; and
   (iii) a beamsplitter surface disposed over said thin film.

5. A device as in claim 2, wherein said optical element further comprises:
   (i) a frame, the central portion of said frame having a flatness within a specified tolerance;
   (ii) a thin film secured to said frame; and
   (iii) a beamsplitter surface disposed over said thin film.

6. A device as in claim 2, wherein said optical element has a length several times greater than its width.

7. A device as in claim 2, wherein said optical element further comprises:
   (i) a frame, the central portion of said frame having a flatness within a specified tolerance;
   (ii) a thin film secured to said frame; and
   (iii) a beamsplitter surface disposed over said thin film.

8. A device as in claim 1, wherein said light source has a width and a length, said length being several times greater than its width.

9. A device as in claim 8, wherein said optical element has a length several times greater than its width.

10. A device as in claim 9, wherein said optical element further comprises:
    (i) a frame, the central portion of said frame having a flatness within a specified tolerance;
    (ii) a thin film secured to said frame; and
    (iii) a beamsplitter surface disposed over said thin film.

11. A device as in claim 8, wherein said optical element further comprises:
    (i) a frame, the central portion of said frame having a flatness within a specified tolerance;
    (ii) a thin film secured to said frame; and
    (iii) a beamsplitter surface disposed over said thin film.

12. A device as in claim 1, wherein said light source further comprises:
    (i) a fiber optic bundle coupled to a light source; and
    (ii) a light diffusing panel.

13. A device as in claim 12, wherein said panel is optically coupled to said fiber optic bundle to produce a distributed diffused light.

14. A device as in claim 1, wherein said optical element has a length several times greater than its width.

15. A device as in claim 14, wherein said optical element further comprises:
    (i) a frame, the central portion of said frame having a flatness within a specified tolerance;
    (ii) a thin film secured to said frame; and
    (iii) a beamsplitter surface disposed over said thin film.

16. A device as in claim 1, wherein said optical element further comprises:
    (i) a frame;
    (ii) a thin film secured to said frame; and
    (iii) a beamsplitter surface disposed over said thin film.

17. A device as in claim 16, wherein said frame has a surface which is at least partially covered with a light absorbing element.

18. A device as in claim 16, wherein the central portion of said frame has a flatness within a specified tolerance.

19. A device as in claim 1, wherein said reflecting elements are positioned on opposite sides of said object.

20. A device as in claim 1, wherein said reflecting elements are oriented to define a V-shape.

21. A device as in claim 20, wherein said V-shape defines a plane, said plane being oriented transverse to said second axis.

22. A device as in claim 1, wherein said illumination device is attached to said optical imaging apparatus.

23. A method of illuminating a cylindrical object having a sidewall, in an optical imaging apparatus, said optical imaging apparatus having focusing optics, said focusing optics having an optical axis, light reflected from the cylindrical object sidewall and light traveling with an axis parallel to a line tangential to the object sidewall under observation traveling generally in the direction of said optical axis from said object under observation through said focusing optics to be focused into an image, said object being placed within the field of view of said optical imaging apparatus, said method comprising the steps of:

(a) illuminating said object with a diffuse light source;

(b) reflecting a portion of the light emitted from said light source toward said object under observation using an optical element having a width and a length, said optical element being positioned to receive light from said light source and having the characteristic of reflecting a portion of the light emitted from said light source toward said object under observation, whereby said object is illuminated and reflects light toward said focusing optics;

(c) transmitting a portion of the light reflected from said object toward said focusing optics, the length of said optical element being oriented along a second axis and said optical element being positioned at an acute angle with respect to said optical axis; and (d) collecting and redirecting light toward said object under observation using a pair of reflecting elements, said reflecting elements each having a longer side, each said longer side extending transverse to said optical axis and said second axis, and orienting said object with its axis parallel to said pair of reflecting elements.

\* \* \* \* \*